April 30, 1963 P. KARNOW ETAL 3,087,630
OMNIDIRECTIONAL MANIPULATOR
Filed Feb. 10, 1961 2 Sheets-Sheet 1
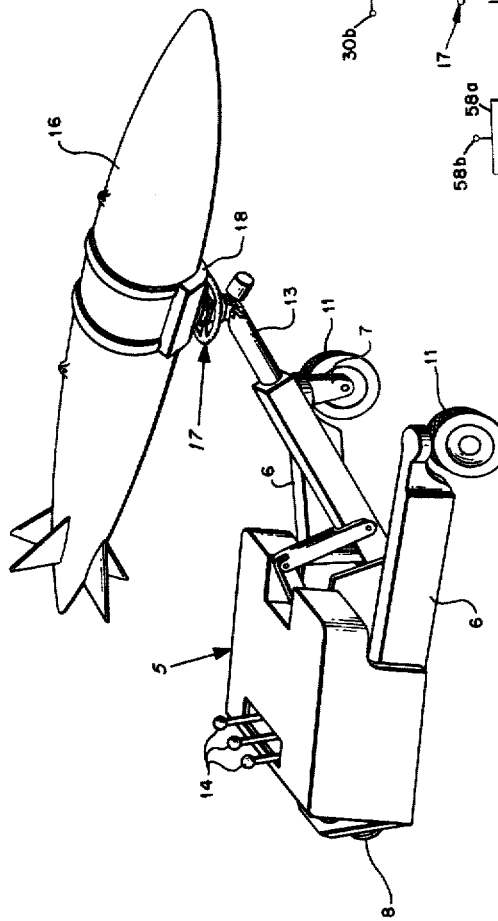
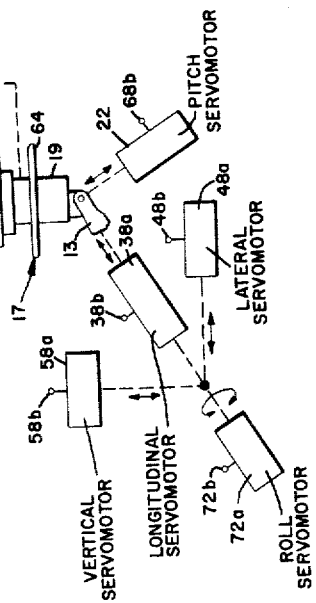
INVENTORS
PAUL KARNOW
ABRAHAM SCHWARTZ
BY
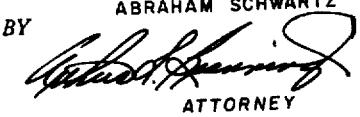
ATTORNEY

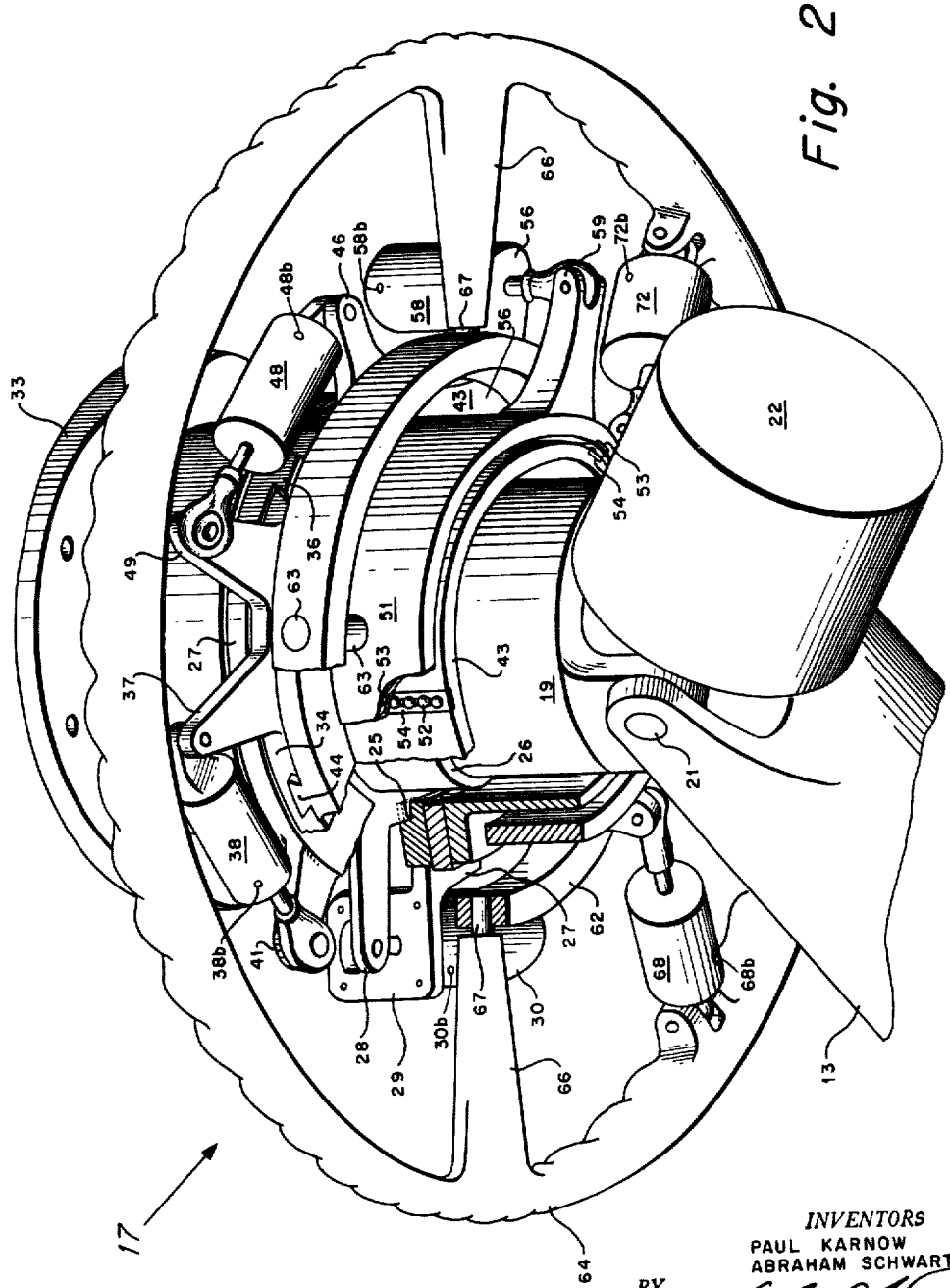

United States Patent Office 3,087,630
Patented Apr. 30, 1963

3,087,630
OMNIDIRECTIONAL MANIPULATOR
Paul Karnow, Glenside, and Abraham Schwartz, Philadelphia, Pa., assignors to the United States of America as represented by the Secretary of the Navy
Filed Feb. 10, 1961, Ser. No. 88,587
10 Claims. (Cl. 214—1)
(Granted under Title 35, U.S. Code (1952), sec. 266)

The invention described herein may be manufactured and used by or for the Government of the United States of America for governmental purposes without the payment of any royalties thereon or therefor.

This invention relates to an omnidirectional manipulator, and more particularly to a hand control device capable of being manipulated according to the instinctive tendencies of a human operator for transporting a load supported on a materials handling apparatus in any desired direction relative to the apparatus at any stage in the transporting operation.

Certain types of materials handling operations, such as aircraft weapons loading, require rapid and precise positioning of the weapons into the aircraft. A versatile materials handling apparatus requires that it be able to displace or incline a load in precise amounts in any direction throughout its operation. The least amount of travel for executing any given displacement usually involves a complex motion of both linear and angular character. This motion can be conveniently resolved into six components for the purpose of mechanization in materials handling apparatus. The components of motion will be hereinafter identified as follows:

(a) Longitudinal displacement,
(b) Lateral displacement,
(c) Vertical displacement,
(d) Roll,
(e) Pitch, and
(f) Yaw.

The components (a), (b) and (c) are linear motions along three axes X, Y and Z, each being normal to the others; and the components (d), (e) and (f), respectively, are simply rotations about these axes. The axes X, Y and Z are identified with longitudinal, lateral and vertical displacements only for the purpose of explanation of the invention, but they can be oriented to any reference chosen.

Materials handling apparatus in prior use have separate and distinct articulations accompanied by power means for each of the six components of motion, and employ a separate manual or pedal control for each of the several power means. Obviously a highly skilled operator is needed to manipulate such an apparatus with any degree of proficiency and precision. The likelihood of an operator being able to execute intelligibly all six components simultaneously appears implausible with heretofore known apparatus. The possibility appears even more implausible where the several controls are located at widely separated positions on the materials handling apparatus or where the operator must observe the motion and position of the load relative to the desired position at some large distance or from some obscured view. Heretofore known materials handling apparatus also require considerable mental concentration on the part of the operator to assure manipulation of the controls in a direction consistent with the desired motion. In weapons loading operations such mental concentration is imperative with such apparatus.

It is therefore an object of the present invention to provide a single omnidirectional manipulator which can respond severally or jointly to the six components of motion and effect rapid and precise transporting of a load supported on a materials handling apparatus of the type adapted for motor-driven articulation in each of the six components of motion, which is mounted on a materials handling apparatus so that the operator can maintain an unobscured view of the load relative to the desired position or target, which will minimize the mental concentration required of the operator by utilizing his instinctive tendencies to guide the load, and which physiologically and psychologically aids the operator in the execution of complex motions to heavy loads.

Another object of the invention is to provide an improved omnidirectional manipulator which will be relatively simple, compact, convenient, practical and inexpensive.

Various other objects and advantages will appear from the following description of one embodiment of the invention, and the most novel features will be particularly pointed out hereinafter in connection with the appended claims.

In the accompanying drawing:

FIG. 1 represents a perspective view of a materials handling apparatus with a load supported thereon and incorporating an omnidirectional manipulator of the present invention;

FIG. 2 represents an isometric view of the omnidirectional manipulator of FIG. 1 as viewed from underneath and forward of the boom and with several of its parts in partial cross sections, and FIG. 3 is a schematic representation of the boom and manipulator including the power actuators of the servo system for generating the six components of motion.

In the illustrated embodiment of the invention, the materials handling apparatus is a mobile lift truck, indicated generally by the numeral 5, and includes a pair of forwardly and laterally extending members 6. Wheels 11 are pivotally connected at the outer ends of the members 6 by struts 7 so that the wheels 11 can roll on a deck or floor and also turn about vertical axes. The lift truck 5 is also supported at the rear by rolling means 8. The lift truck 5 further includes means, not shown, for selectively braking it against rolling. A telescoping boom 13 is pivotally connected at its base to the front of the lift truck 5 for rotation about its base in any direction. This rotation is conveniently resolved into vertical and lateral components of motion having separate power actuators 58a and 48a, respectively. These components correspond to the vertical and lateral displacements, respectively. The slidable portion of the boom 13 at the outer end also includes a separate power actuator 38a, varying the length of the boom 13. This component corresponds to the longitudinal displacement. Obviously, a change in any one of these displacements will also be accompanied by ancillary changes in the others. The ancillary changes are automatically canceled by appropriate control action to be explained hereinbelow. Manual controls 14 are provided on the lift truck 5 for separately controlling each of the power actuators for vertical, lateral and longitudinal displacements. It is contemplated that the controls 14 may be coarse-adjusting because they serve only to transport a load such as a bomb 16 supported at the end of the boom 13 into the approximate vicinity of its desired position with dispatch. Additional controls 14 can be added for obtaining other components of motion of the bomb 16; namely, roll, yaw, and pitch.

An auxiliary controller or omnidirectional manipulator 17 produces all six of the components of motion, like six separate controls 14, except that it comprises a single hand wheel positioned on the end of the boom 13 especially adapted for rapidly and precisely positioning the load to the desired destination. It is contemplated that the manipulator 17 also may be fine-adjusting in order to obtain the precise position of the load with no overtravel.

The schematic representation of the boom 13 and the manipulator 17 illustrates one manner of effecting the six components of motion. The particular servo system used to convey signals produced by the controls 14 or the manipulator 17 may be of any conventional electric, hydraulic, or pneumatic mode; and the manner in which the six separate and distinct components of motion are transmitted in the materials handling apparatus to the load may be of any construction consistent with the known design practices, as they do not form one of the essential parts of the present invention.

The manipulator 17 is disposed between the outer end of the boom 13 and a cradle 18, the latter being directly secured to the bomb 16. The main supporting structure of the manipulator 17 is a cylindrical wrist 19 pivotally connected at one end at diametrically opposite sides to the outer end of the boom 13 by coaxial wrist pins 21 (only one visible). The angular position of the wrist 19 about the pins 21 is determined by a wrist actuating motor 22, which is operatively connected by a scissors-type linkage, not shown, between the boom 13 and the wrist 19. It will be noted that when the common axis of the pins 21 is horizontal, as determined by the angular position of the outer extension of the boom 13 about its longitudinal axis, rotation of the wrist 19 about the pins 21 by the motor 22 will produce pure pitch in the bomb 16. Any displacement of the common axis of the pins 21 from the horizontal, due to rotation of the outer extension of the boom 13 about its longitudinal axis, will produce a combination of roll and pitch in the bomb 16 when the motor 22 is actuated.

The outer end of the wrist pin 19 includes a collar 26 fixed thereto and concentrically supports an outer annular plate 27 by a groove connection 25 therebetween. The groove connection 25 is a loose fit allowing the outer plate 27 to rotate about the concentrical axis relative to the collar 26. A radial arm 28, fixed to the collar 26 and extending outwardly through a recessed portion of the outer plate 27, is operatively connected at its outer terminal to one end of a yaw transducer 30. The other end of the yaw transducer 30 is operatively connected to the outer terminal of a radial bracket 29 which is fixed to the outer plate 27 and extends outwardly therefrom. The yaw transducer 30 is of the type in which its ends are movable relative to each other and produce an output signal proportional thereto. Hence, any relative angular motion between the wrist 19 and the outer plate 27 is transmitted respectively through the arm 28 and bracket 29 to yaw transducer 30. Depending upon the mode of servo system employed, the yaw transducer 30 may be any convenient hydraulic, pneumatic, or electric type.

An annular yaw table 33, fixed against the lower surface of the cradle 18 and concentric with the wrist 19, is operatively connected to a motor 30a to produce rotation of the table 33 relative to the wrist 19 about the concentrical axis. By connecting means 30b, the motor 30a will respond to a discrete change in output signal from the yaw transducer 30 and thereby rotate the yaw table a proportional angular amount.

The outer plate 27 concentrically supports an annular slide 34 by two dovetail groove connections 36, only one being visible, which are aligned on coinciding diameters of the outer plate 27 and the slide 34. A radial bracket 37, fixed to the slide 34 and extending outwardly and laterally from the groove connections 36, is operatively connected at its outer terminal to one end of a longitudinal displacement transducer 38. The other end of the transducer 38 is operatively connected to the outer terminal of a radial arm 41 which is fixed to the outer plate 27 and extends outwardly and laterally from the groove connections 36. Like the yaw transducer 30, the longitudinal displacement transducer 38 produces an output signal proportional to the relative motion of its ends. Hence, any relative linear motion between the outer plate 27 and the slide 34 along the groove connections 36 is transmitted respectively through the bracket 37 and the arm 41 to the transducer 38. By connecting means, 38b a motor 38a in the lift truck 5 will respond to a discrete change in an output signal of the longitudinal displacement transducer 30 and thereby extend or retract the outer extension of the boom 13 a proportional linear amount. It will be noted that boom extension or retraction will introduce ancillary changes in other components of motion, but these will be offset by subsequent control action.

The slide 34, in turn, concentrically supports a sleeve 43 by two dovetailed groove connections 44, only one being visible, which are aligned on coinciding diameters of the annular slide 34 and an upper flange of the sleeve 43. The groove connections 44 are angularly displaced 90 degrees from the groove connections 36 whereby relative linear motion between the sleeve 43 and the slide 34 is normal to relative linear motion between the slide 34 and the plate 27. A radial bracket 46, fixed to the periphery of the upper flange of the sleeve 43 extending outwardly and laterally therefrom, is operatively connected at its outer terminal to one end of a lateral displacement transducer 48. The other end of the transducer 48 is operatively connected to the outer terminal of a radial arm 49 which is fixed to the slide 34 and extends outwardly therefrom. Hence, relative linear motion between the slide 34 and the sleeve 43 along the groove connections 44 is transmitted through the bracket 46 and the arm 49 to the transducer 48. By connecting means 48b, a motor 48a in the lift truck 5 will respond to a discrete change in an output signal of the lateral displacement transducer 48 and thereby cause the boom 13 to swing at its base about a vertical axis to produce lateral displacement at the outer end of the boom 13 a proportional linear amount. It will be noted that boom swing will introduce ancillary changes in other components of motion, but these will be offset by subsequent control action.

A vertically movable ring 51 is concentrically supported about the sleeve 43 by a plurality of ball bearings 52 contained in races 53 and 54 which are grooved, respectively, in confronting surfaces of the sleeve 43 and the ring 51. The races 53 and 54 are oriented at spaced intervals around the respective sleeve 43 and ring 51 and are parallel to the center of the concentrical axis; hence, the ring 51 can only move linearly along the concentric axis relative to the sleeve 43. A radial bracket 56, fixed to the sleeve 43 extending outwardly therefrom, is operatively connected at its outer terminal to one end of a vertical displacement transducer 58. The other end of the transducer 58 is operatively connected to the outer terminal of a radial ring arm 59 which is fixed to the ring 51 and extends outwardly therefrom. Hence, relative linear motion between the ring 51 and the sleeve 43 along the concentric axis is transmitted through the bracket 56 and the arm 49 to the transducer 58. By connecting means 58b, a motor 58a in the lift truck 5 will respond to a discrete change in an output signal at the vertical displacement transducer 58 and thereby cause the boom 13 to pivot at its base about a horizontal axis thereby raising or lowering the outer end of the boom 13 a proportional linear amount. It will be noted that vertical angular displacement of the boom 13 will be accompanied by ancillary changes in other components of motion, but these will be offset by subsequent control action.

A gimbal ring 62 is concentrically supported about the ring 51 by two diametrically opposite and coaxial gimbal pins 63, only one being visible, whereby the gimbal ring 62 can be rotated about the pivotal axes of the pins 63 relative to the ring 51. A control wheel 64 is concentrically supported about the gimbal ring 62 by two diametrically opposite and coaxial wheel pins 67 mounted at the inner extremities of coaxial and radial spokes 66. These spokes 66 are fixed to the control wheel 64 and extend inwardly therefrom. The pivotal axis formed by the pins 67 is 90 degrees displaced from the pivotal axis of the pins 63 as measured in the plane of the gimbal ring 62.

In a plane normal to the wrist pins 21 and in the longitudinal axis of the boom 13, a pitch transducer 68 is operatively connected at one of its ends to the control wheel 64 and at its other end to the ring 51. The response axis of the transducer 68, along which relative motion between the ends of the transducer 68 occurs, is inclined at an angle α from a plane normal to the concentrical axis of the ring 51 and wheel 64 so that small displacement angles of the control wheel 64 about either axis of the pins 63 or 67 will cause substantial relative linear motion between the opposite ends of the transducer 68. Hence, a pitch displacement of the control wheel 64 about an axis in the plane thereof and parallel to the axis of the wrist pins 21 will produce a discrete output signal at the transducer 68. By connecting means, not shown, the wrist actuating motor 22 will respond to the output signal of the transducer 68 and thereby cause the wrist 19 to rotate about the pins 21 with respect to he boom 13 a proportional angular amount.

In a plane coinciding with the pivotal axis of the pins 21 and the concentrical axis of the gimbal ring 62, a roll trandsucer 72 is operatively connected at one of its ends to the control wheel 64 and at its other end to the ring 51. The response axis of the roll transducer 72 is also inclined at an angle α' in the same manner and for the reason described in connection with the pitch transducer 68. Hence, a roll displacement of the control wheel 64 about the axis in the plane thereof and normal to the axis of the wrist pins 21 will produce a discrete output signal at the transducer 72. By connecting means 72b, a motor 72a in the lift truck 5 will respond to the output signal of the transducer 72 and cause the outer extension of the boom 13 to rotate about its own longitudinal axis a proportional angular amount.

It will be noted that rotation of the outer extension of the boom 13 or of the wrist 19 will be accompanied by ancillary changes in other components of motion, but these will be offset by subsequent control action.

It is now apparent that the six components of motion imparted to the single control wheel 64 will produce six separate and distinct signals for positioning six individual actuators which, in turn, reproduce them on the bomb 16 carried in the cradle 18 of the lift truck 5. The components of roll and pitch imparted on the control wheel 64 are detected directly through its connection to the respective pitch and roll transducers 68 and 72, respectively. Yaw, longitudinal, lateral, and vertical displacement on the control wheel 64 are transmitted through several elements before it reaches the respective yaw, longitudinal, lateral and vertical transducers 30, 38, 48, and 58, respectively.

An angular displacement of the control wheel 64 about the concentrical axis thereof, or yaw, causes the plate 27, slide 34, sleeve 43, ring 51, and gimbal ring 62 to rotate therewith by virtue of the groove connections 44, bearings 52, and pins 63 and 67 connected therebetween. Rotation of the plate 27 is relative to the wrist 19, and produces a signal proportional to the yaw imparted to the control wheel 64.

A longitudinal displacement of the control wheel 64 will cause the slide 34, sleeve 43, ring 51, and gimbal ring 62 to move therewith in the same amount by virtue of the mechanical interconnections. Relative motion appears along the groove connections 36 between the slide 34 and the plate 27 and causes a signal to be produced at the longitudinal displacement transducer 38 which is proportional to the displacement imparted to the control wheel 64.

A lateral displacement of the control wheel 64 will similarly produce corresponding lateral displacement of the sleeve 43, the ring 51 and the gimbal ring 62 to produce relative motion along the connections 44 between the slide 34 and the sleeve 43. This motion is detected and translated to a discrete control signal by the lateral displacement transducer 48.

A vertical displacement of the control wheel 64 will also displace the ring 51 and gimbal ring 62 by the same amount. The bearings 52 permit the ring 51 to move relative to the sleeve 43 and produce thereby a signal proportional to the displacement at the vertical transducer 58.

It is contemplated that centering springs be used between the relative moving parts to compensate for the effects of mass of the respective elements and to stop control action and motion of the load when the control wheel 64 is released.

It is thus seen that the omnidirectional manipulator 17 provides a means for producing any complex motion with a single manual control wheel so that an operator of a power-amplified loading machine can effect precision movement of a large heavy object through space into critical alignment at a desired destination. The operator's instinctive tendencies to guide the load are utilized as the initiating motion in this control device. The manipulator is particularly applicable to rapid weapons loading operations in modern aircraft, and permits the operator to closely observe the positioning of the weapon in otherwise obscure areas such as a bomb bay.

It will be understood that various changes in the details, materials, steps and arrangements of parts, which are herein described and illustrated in order to explain the nature of the invention, may be made by those skilled in the art within the principle and scope of the invention as expressed in the appended claims.

What is claimed is:

1. A materials handling apparatus for precisely moving a load in any direction utilizing the instinctive tendencies of an operator, comprising, in combination: a lift truck having an extendible boom rotatable about horizontal and vertical axes through its base and about its longitudinal axis, a longitudinal motor operatively connected to said lift truck for extending said boom, a lateral motor operatively connected to said lift truck for rotating said boom about said vertical axis, a vertical motor operatively connected to said lift truck for rotating said boom about said horizontal axis, a roll motor operatively connected to said lift truck for rotating said boom about said longitudinal axis, a roll motor operatively connected to said lift truck for rotating said boom about said longitudinal axis, a cylindrical wrist rotatably connected at one of its ends on a pivotal axis through said longitudinal axis to the outer terminal of said boom, a pitch motor operatively connected to said boom and said wrist for rotating said wrist about said pivotal axis relative to said boom, a cradle formed to receive and secure a load and rotatably connected to said wrist means on a concentrical axis, a yaw motor operatively connected to said wrist and said cradle for rotating said cradle about said concentrical axis relative to said wrist, an annular plate concentrically and slidably connected to said wrist for rotation relative thereto about said concentrical axis, a yaw transducer operatively connected to said wrist and said plate for producing an output signal indicative of said plate rotation, conduit means connecting said output signal from said yaw transducer to said yaw motor for actuation thereof, an annular slide concentrically and slidably connected to said plate for rectilinear motion relative thereto along one diameter of said plate, a longitudinal displacement transducer operatively connected to said plate and said slide for producing an output signal indicative of said slide rectilinear motion, conduit means connecting said output signal from said longitudinal displacement transducer to said longitudinal motor for actuation thereof, a sleeve concentrically and slidably connected to said slide for rectilinear motion relative thereto along another diameter of said plate normal to said one plate diameter, a lateral displacement transducer operatively connected to said slide and said sleeve for producing an output signal indicative of said sleeve rectilinear motion, conduit means connecting said output signal from said lateral displacement transducer to said lateral motor for actuation thereof, a vertical ring concentrically and slidably connected to said sleeve for rectilinear motion relative thereto along said concentrical axis, a vertical displacement transducer operatively connected to said sleeve and said vertical ring for producing an output signal indicative of said vertical ring rectilinear motion, conduit means connecting said output signal from said vertical displacement transducer to said vertical motor for actuation thereof, a gimbal ring concentrically and rotatably connected about one diameter thereof to said vertical ring, a control wheel concentrically and rotatably connected to said gimbal ring about another diameter thereof normal to said one gimbal ring diameter, a pitch transducer operatively connected to said control wheel and said vertical ring with its axis in a plane normal to said wrist pivotal axis and inclined from the plane of said control wheel for producing an output signal indicative of said control wheel rotation relative to said vertical ring about an axis parallel to said wrist pivotal axis, conduit means connecting the output signal from said pitch transducer to said pitch motor for actuation thereof, a roll transducer operatively connected to said control wheel and said vertical ring with its axis parallel to said wrist pivotal axis and inclined from the plane of said control wheel for producing an output signal indicative of said control wheel rotation relative to said vertical ring about an axis parallel to said wrist pivotal axis and conduit means connecting said output signal from said roll transducer to said roll motor for actuation thereof; whereby any motion of said control wheel will be resolved into separate and distinct components and imparted to a load supported on said cradle.

2. A materials handling apparatus for precisely moving a load in any direction utilizing the instinctive tendencies of an operator, comprising, in combination: a lift truck having an extendible boom rotatable about horizontal and vertical axes through its base and about its longitudinal axis, a cylindrical wrist rotatably connected at one of its ends on a pivotal axis through said longitudinal axis to the outer terminal of said boom, a cradle formed to receive and secure a load and rotatably connected to said wrist means on a concentric axis, power means operatively connected to said lift truck for moving said cradle in any direction, an annular plate concentrically and slidably connected to said wrist for rotation relative thereto about said concentric axis, a jaw transducer operatively connected to said wrist and said plate for producing an output signal indicative of said plate rotation, an annular slide concentrically and slidably connected to said plate for rectilinear motion relative thereto along one diameter of said plate, a longitudinal displacement transducer operatively connected to said plate and said slide for producing an output signal indicative of said slide rectilinear motion, a sleeve concentrically and slidably connected to said slide for rectilinear motion relative thereto along another diameter of said plate normal to said one plate diameter, a lateral displacement transducer operatively connected to said slide and said sleeve for producing an output signal indicative of said sleeve rectilinear motion, a vertical ring concentrically and slidably connected to said sleeve for rectilinear motion relative thereto along said concentrical axis, a vertical displacement transducer operatively connected to said sleeve and said vertical ring for producing an output signal indicative of said vertical ring rectilinear motion, a gimbal ring concentrically and rotatably connected about one diameter thereof to said vertical ring, a control wheel concentrically and rotatably connected to said gimbal ring about another diameter thereof normal to said one gimbal ring diameter, a pitch transducer operatively connected to said control wheel and said vertical ring with its axis in a plane normal to said wrist pivotal axis and inclined from the plane of said control wheel for producing an output signal indicative of said control wheel rotation relative to said vertical ring about an axis parallel to said wrist pivotal axis, a roll transducer operatively connected to said control wheel and said vertical ring with its axis parallel to said wrist pivotal axis and inclined from the plane of said control wheel for producing an output signal indicative of said control wheel rotation relative to said vertical ring about an axis parallel to said wrist pivotal axis, and conduit means connecting said output signals from each of said transducers to said power means for actuation thereof; whereby any motion of said control wheel will be resolved into separate and distinct components and imparted to a load supported on said cradle.

3. A materials handling apparatus for precisely moving a load in any direction utilizing the instinctive tendencies of an operator, comprising, in combination: a lift truck having an extendible boom rotatable about normally disposed first and second axes through its base and about its longitudinal axis, first power means operatively connected to said lift truck for extending said boom, second power means operatively connected to said lift truck for rotating said boom about said second axis, third power means operatively connected to said lift truck for rotating said boom about said first axis, fourth power means operatively connected to said lift truck for rotating said boom about said longitudinal axis, a cylindrical wrist rotatably connected at one of its ends on a pivotal axis through said longitudinal axis to the outer terminal of said boom, fifth power means operatively connected to said boom and said wrist for rotating said wrist about said pivotal axis relative to said boom, a cradle formed to receive and secure a load and rotatably connected to said wrist means on a concentric axis, sixth power means operatively connected to said wrist and said cradle for rotating said cradle about said concentrical axis relative to said wrist, an annular plate concentrically and slidably connected to said wrist for motion relative thereto about said concentric axis, first transducer means operatively connected to said wrist and said plate for producing an output signal indicative of said plate motion, conduit means connecting said output signal from said first transducer means to said sixth power means for actuation thereof, an annular slide concentrically and slidably connected to said plate for motion relative thereto along one diameter of said plate, second transducer means operatively connected to said plate and said slide for producing an output signal indicative of said slide motion, conduit means connecting said output signal from said second transducer means to said first power means for actuation thereof, a sleeve concentrically and slidably connected to said slide for motion relative thereto along another diameter of said plate normal to said one plate diameter, a third transducer means operatively connected to said slide and said sleeve for producing an output signal indicative of said sleeve motion, conduit means connecting said output signal from said third transducer means to said second power means for actuation thereof, a ring concentrically and slidably connected to said sleeve for motion relative thereto along said concentrical axis, fourth transducer means operatively connected to said sleeve and said ring for producing an output signal indicative of said ring motion, conduit means connecting said output signal from said fourth transducer means to said third power means for actuation thereof, a gimbal concentrically and operatively connected about one diameter thereof to said ring, a control wheel concentrically and operatively connected to said gimbal about another diameter thereof normal to said one gimbal diameter, fifth transducer means operatively connected to said control wheel and said ring with its axis in a plane normal to said wrist pivotal axis and inclined from the plane of said control wheel for producing an output signal indicative of said control wheel motion relative to said ring about an axis parallel to said wrist pivotal axis, conduit means connecting the output signal from said fifth transducer means to said fifth power means for actuation thereof, sixth transducer means operatively connected to said control wheel and said ring with its axis parallel to said wrist pivotal axis and inclined from the plane of said control wheel for producing an output signal indicative of said control wheel motion relative to said vertical ring about an axis parallel to said wrist pivotal axis, and conduit means connecting said output signal from said fifth transducer means to said fourth power means for actuation thereof; whereby any motion of said control wheel will be resolved into separate and distinct components and imparted to a load supported on said cradle.

4. A materials handling apparatus for precisely moving a load in any direction utilizing the instinctive tendencies of an operator, comprising, in combination: a lift truck having an extendible boom movable about normally disposed first and second axes through its base and about its longitudinal axis, a cylindrical wrist movably connected at one of its ends on a pivotal axis through said longitudinal axis to the outer terminal of said boom, a cradle formed to receive and secure a load and movably connected to said wrist means, power means operatively connected to said lift truck for moving said cradle in any direction, an annular plate movably connected to said wrist for motion relative thereto, first transducer means operatively connected to said wrist and said plate for producing an output signal indicative of said plate motion, an annular slide movably connected to said plate for motion relative thereto, second transducer means operatively connected to said plate and said slide for producing an output signal indicative of said slide motion, a sleeve movably connected to said slide for motion relative thereto, third transducer means operatively connected to said slide and said sleeve for producing an output signal indicative of said sleeve motion, a ring movably connected to said sleeve for motion relative thereto, fourth transducer means operatively connected to said sleeve and said ring for producing an output signal indicative of said ring motion, a gimbal connected to said ring, a control wheel movably connected to said gimbal, fifth transducer means operatively controlled to said control wheel and said ring for producing an output signal indicative of said control wheel motion relative to said ring, sixth transducer means operatively connected to said control wheel and said ring for producing an output signal indicative of said control wheel motion relative to said ring, and conduit means connecting said output signals from each of said transducer means to said power means for actuation thereof; whereby any motion of said control wheel will be resolved into separate and distinct components and imparted to a load supported on said cradle.

5. An omnidirectional manipulator for producing a plurality of separate and distinct signals indicative of any motion thereof comprising: cylindrical central support means, an annular plate concentrically connected to said support means and rotatable relative thereto about the concentrical axis, a first angular motion transducer operatively connected to said support means and said plate for producing an output signal indicative of said plate rotation, an annular slide concentrically and slidably connected to said plate for rectilinear motion relative thereto along one diameter of said plate, a first linear displacement transducer operatively connected to said plate and said slide for producing an output signal indicative of said slide rectilinear motion, a sleeve concentrically and slidably connected to said slide for rectilinear motion relative thereto along another diameter of said plate normal to said one diameter, a second linear displacement transducer operatively connected to said slide and said sleeve for producing an output signal indicative of said sleeve rectilinear motion, a ring concentrically and slidably connected to said sleeve means for rectilinear motion relative thereto along said concentrical axis, a third linear displacement transducer operatively connected to said sleeve means and said ring for producing an output signal indicative of said ring rectilinear motion therebetween, a gimbal concentrically and rotatably connected about one diameter thereof to said ring, a control wheel concentrically and rotatably connected to said gimbal about another diameter thereof normal to said one gimbal diameter, a second angular motion transducer operatively connected to said control wheel and said ring with its axis in a plane normal to the plane of said control wheel and inclined therefrom for producing an output signal indicative of said wheel rotation relative to said ring about an axis normal to the plane of said second angular motion transducer, a third angular motion transducer operatively connected to said wheel and said ring in a plane normal to the plane of said second angular motion transducer and inclined from the plane of said control wheel for producing an output signal indicative of said control wheel rotation relative to said ring about an axis normal to the plane of said third angular motion transducer; whereby any motion of said control wheel will be resolved into output signals of separate and distinct components.

6. An omnidirectional manipulator for producing a plurality of separate and distinct signals indicative of any motion thereof comprising: cylindrical central support means, an annular plate concentrically and slidably connected to said support means for rotation relative thereto about the concentrical axis, first transducer means operatively connected to said support means and said plate for producing an output signal indicative of said plate rotation, an annular slide concentrically and slidably connected to said plate for motion relative thereto along one diameter of said plate, second transducer means operatively connected to said plate and said slide for producing an output signal indicative of said slide motion, a sleeve concentrically and slidably connected to said slide for motion relative thereto along another diameter of said plate normal to said one diameter, third transducer means operatively connected to said slide and said sleeve for producing an output signal indicative of said sleeve motion, a ring concentrically and slidably connected to said sleeve means for motion relative thereto along said concentrical axis, fourth transducer means operatively connected to said sleeve means and said ring for producing an output signal indicative of said ring motion, a gimbal concentrically and rotatably connected about one diameter thereof to said ring, a control wheel concentrically and rotatably connected to said gimbal about another diameter thereof normal to said one gimbal diameter, fifth transducer means operatively connected to said control wheel and said ring with its axis in a plane normal to the plane of said control wheel and inclined therefrom for producing an output signal indicative of said wheel rotation relative to said ring about an axis normal to the plane of said third transducer means, sixth transducer means operatively connected to said wheel and said ring in a plane normal to the plane of said third transducer means and inclined from the plane of said control wheel for producing an output signal indicative of said control wheel rotation relative to said ring about an axis normal to the plane of said sixth transducer means; whereby any motion of said control wheel will be resolved into output signals of separate and distinct components.

7. An omnidirectional manipulator for producing a plurality of separate and distinct signals indicative of any motion thereof comprising: cylindrical support means, an annular plate concentrically and slidably connected to said support means for motion relative thereto about the concentrical axis, first means operatively connected to said support means and said plate for producing an output signal indicative of said plate motion, an annular slide concentrically and slidably connected to said plate for motion relative thereto along one diameter of said plate, second means operatively connected to said plate and said slide for producing an output signal indicative of said slide motion, a sleeve concentrically and slidably connected to said slide for motion relative thereto along another diameter of said plate normal to said one diameter, third means operatively connected to said slide and said sleeve for producing an output signal indicative of said sleeve motion, a ring concentrically and slidably connected to said sleeve means for motion relative thereto along said concentrical axis, fourth means operatively connected to said sleeve and said ring for producing an output signal indicative of said ring motion, a gimbal concentrically and operatively connected about one diameter thereof to said ring, a control wheel concentrically and operatively connected to said gimbal about another diameter thereof normal to said one gimbal diameter, fifth means operatively connected to said control wheel and said ring with its axis in a plane normal to the plane of said control wheel and inclined therefrom for producing an output signal indicative of said control wheel motion relative to said ring about an axis normal to the plane of said fifth means, sixth means operatively connected to said control wheel and said ring in a plane normal to the plane of said fifth means and inclined from the plane of said control wheel for producing an output signal indicative of said control wheel motion relative to said ring about an axis normal to the plane of said sixth means; whereby any motion of said control wheel will be resolved into output signals of separate and distinct components.

8. An omnidirectional manipulator for producing a plurality of separate and distinct signals indicative of any motion thereof comprising: cylindrical central support means, an annular plate concentrically connected to said support means and rotatable relative thereto about the concentrical axis, a first angular motion transducer operatively connected to said support means and said plate for producing an output signal indicative of said plate rotation, an annular slide concentrically and slidably connected to said plate for rectilinear motion relative thereto along one diameter of said plate, a first linear displacement transducer operatively connected to said plate and said slide for producing an output signal indicative of said slide rectilinear motion, a sleeve concentrically and slidably connected to said slide for rectilinear motion relative thereto along another diameter of said plate normal to said one diameter, a second linear displacement transducer operatively connected to said slide and said sleeve for producing an output signal indicative of said sleeve rectilinear motion, a ring concentrically and slidably connected to said sleeve means for rectilinear motion relative thereto along said concentrical axis, a third linear displacement transducer operatively connected to said sleeve means and said ring for producing an output signal indicative of said ring rectilinear motion therebetween, a gimbal concentrically and rotatably connected about one diameter thereof to said ring, a control wheel concentrically and rotatably connected to said gimbal about an other diameter thereof normal to said one gimbal diameter, a second angular motion transducer operatively connected to said control wheel and said ring with its axis in a plane normal to the plane of said control wheel and inclined therefrom for producing an output signal indicative of said wheel rotation relative to said ring about an axis normal to the plane of said second angular motion transducer, a third angular motion transducer operatively connected to said wheel and said ring in a plane normal to the plane of said second angular motion transducer and inclined from the plane of said control wheel for producing an output signal indicative of said control wheel rotation relative to said ring about an axis normal to the plane of said third angular motion transducer; whereby any motion of said control wheel will be resolved into output signals of separate and distinct components.

9. A materials handling apparatus for precisely positioning a load comprising, in combination: boom means for producing longitudinal, lateral, vertical, roll, yaw and pitch components of motion to a load supported at the outer end thereof, unitary omnidirectional manipulator means operatively connected at said outer end for resolving any motion thereof resulting from instinctive tendencies of an operator to move the load into output signals indicative of each of said components of motion; and conduit means connecting said signals from said manipulator to said boom means; whereby the operator obtains a close and unobscured view of the load as it is moved to a desired destination.

10. A materials handling apparatus for precisely positioning a load comprising, in combination: boom means for producing six separate and distinct components of motion to a load supported at the outer end thereof, unitary omnidirectional manipulator means operatively connected at said outer end for resolving any motion thereof resulting from instinctive tendencies of an operator to move the load into output signals indicative of said components; and conduit means connecting said signals from said manipulator to said boom means; whereby the operator obtains a close and unobscured view of the object as it moves to a precise destination.

References Cited in the file of this patent
UNITED STATES PATENTS

| | | |
|---|---|---|
| 1,436,508 | Lane et al. | Nov. 21, 1922 |
| 1,880,138 | Hubl | Sept. 27, 1932 |
| 2,396,309 | Wodal | Mar. 12, 1946 |
| 2,476,249 | Payne | July 12, 1949 |
| 2,479,623 | Johnson | Aug. 23, 1949 |
| 2,523,734 | Stephenson | Sept. 26, 1950 |
| 2,600,887 | Lannen | June 17, 1952 |
| 2,613,822 | Stanley | Oct. 14, 1952 |
| 2,786,723 | Harsch | Mar. 26, 1957 |
| 2,833,422 | Ferweda | May 6, 1958 |
| 2,936,847 | Eitel | May 17, 1960 |

UNITED STATES PATENT OFFICE
CERTIFICATE OF CORRECTION

Patent No. 3,087,630   April 30, 1963

Paul Karnow et al.

It is hereby certified that error appears in the above numbered patent requiring correction and that the said Letters Patent should read as corrected below.

Column 7, line 56, for "jaw" read -- yaw --; column 9, line 51, for "controlled" read -- connected --.

Signed and sealed this 7th day of January 1964.

(SEAL)
Attest:

ERNEST W. SWIDER        EDWIN L. REYNOLDS

Attesting Officer        Acting Commissioner of Patents